June 8, 1926.
H. H. WIEBE
LICENSE PLATE AND HOLDER
1,588,075
Filed Dec. 8, 1923  2 Sheets-Sheet 1
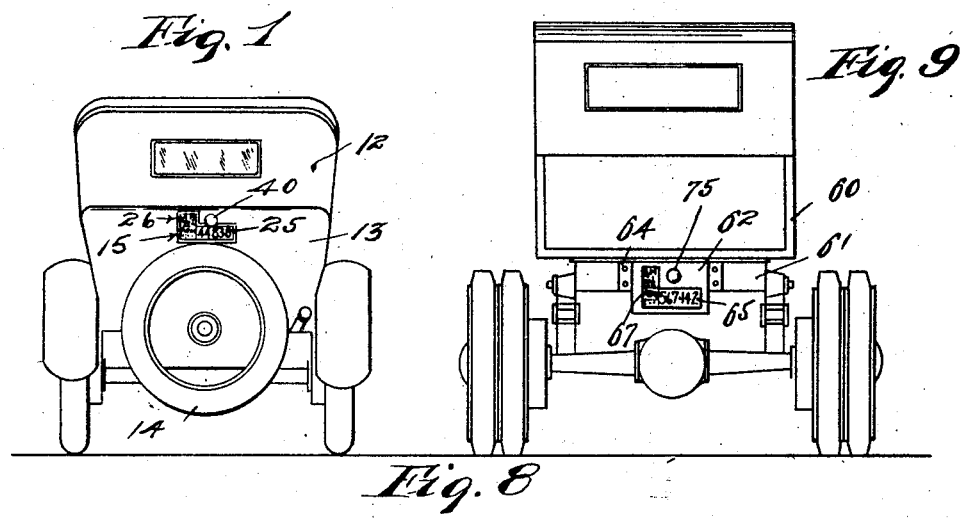
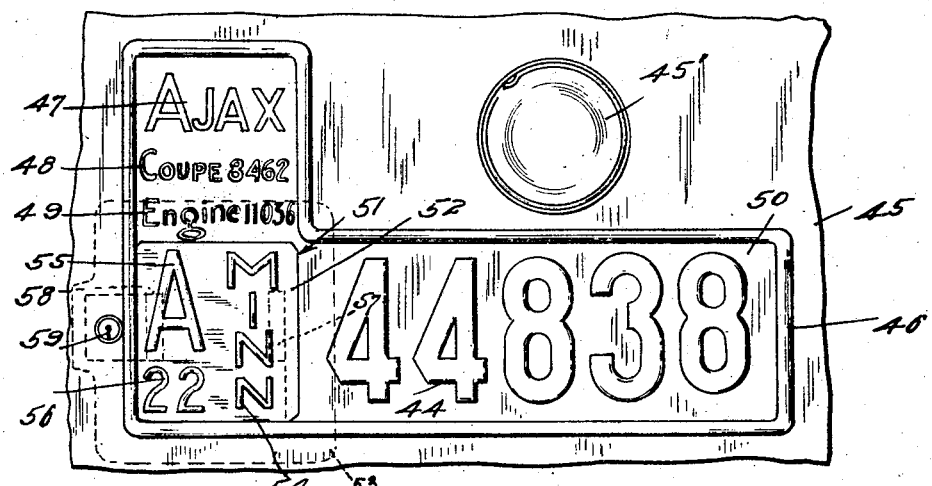
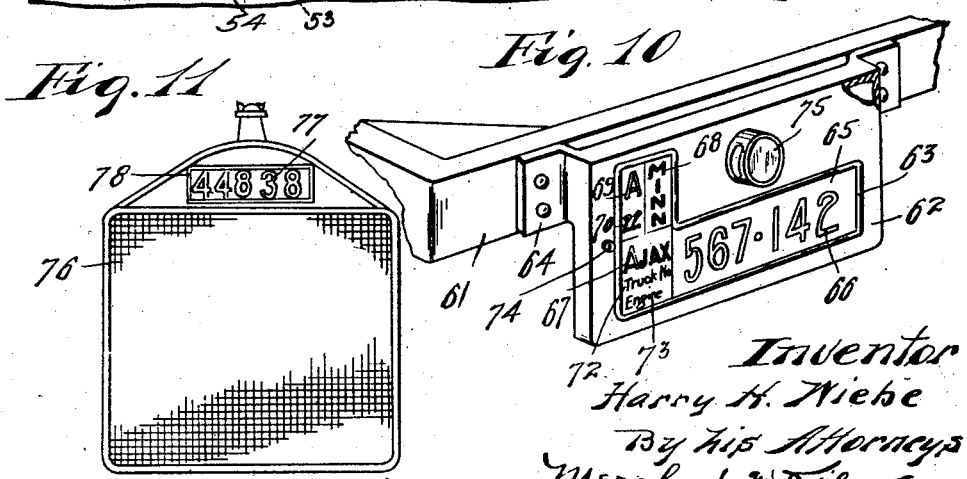

June 8, 1926.
H. H. WIEBE
LICENSE PLATE AND HOLDER
Filed Dec. 8, 1923    2 Sheets-Sheet 2
1,588,075
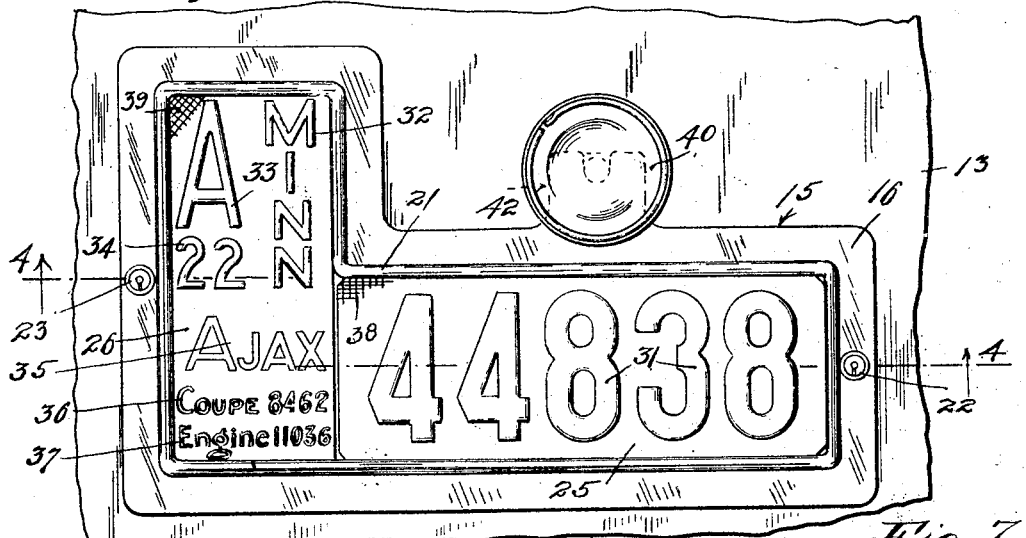
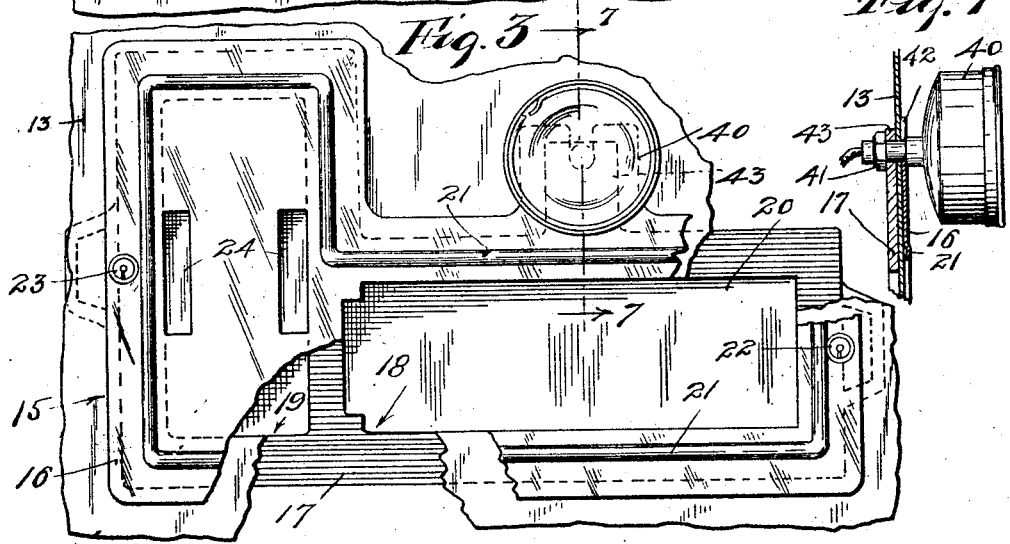
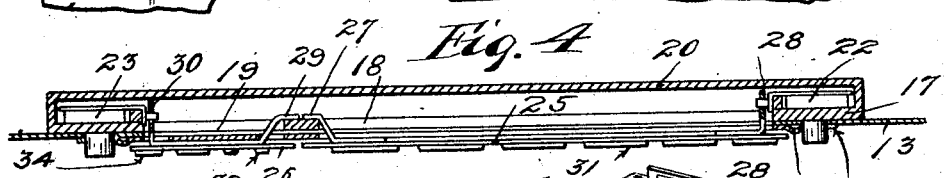
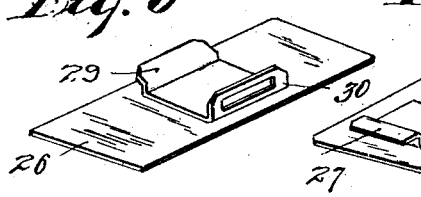
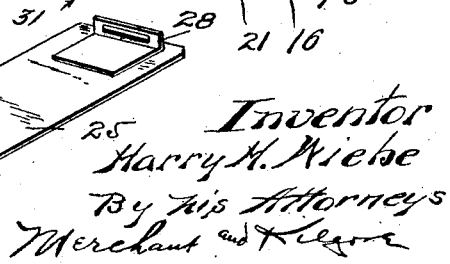
Inventor
Harry H. Wiebe
By his Attorneys
Merchant and Kilgore Patented June 8, 1926.

1,588,075

UNITED STATES PATENT OFFICE.

HARRY H. WIEBE, OF MINNEAPOLIS, MINNESOTA.

LICENSE PLATE AND HOLDER.

Application filed December 8, 1923. Serial No. 679,317.

My present invention relates to vehicle license plates and holders therefor and has for its object to permanently secure said holders to vehicles so that they cannot be removed without mutilating the holder or vehicle and to provide fragile license plates of cast metal or other suitable material that will be broken or mutilated if tampered with in an attempt to remove said license plates from their holders or in an attempt to alter their identifying characters.

Said invention also provides for the locking of license plates in their holders by proper officials to prevent the owner or an unauthorized person from removing the same.

Said invention further provides a license comprising a number plate which may be carried by a vehicle throughout its life and a removable date plate which may also carry other information such as the name of the State issuing the license. Either plate may carry other information such as the name and type of the vehicle, engine number or other identifying character. Such information enables an officer to tell at a glance whether or not the license is on the vehicle for which it was originally issued.

Preferably, the date plate will have a different color each year so as to make the same more conspicuous.

The improved holder prevents the loss of license plates and if a vehicle has a broken or mutilated license plate it is an indication that the vehicle has been stolen or that the license plate has been transferred from another car.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a rear elevation of a touring automobile having one form of the improved license and holder applied thereto;

Fig. 2 is an enlarged view of the license and holder together with the surrounding portions of the vehicle body, as shown in Fig. 1;

Fig. 3 is a view corresponding to Fig. 2 with the exception that some parts have been removed and other parts broken away;

Fig. 4 is a view principally in horizontal section taken on the irregular line 4—4 of Fig. 2;

Figs. 5 and 6 are, respectively, rear perspective views of the number plate and date plate removed from the holder;

Fig. 7 is a detail view with some parts sectioned on the line 7—7 of Fig. 3;

Fig. 8 is a view corresponding to Fig. 2 but illustrating a slight modification;

Fig. 9 is a rear elevation of a truck having another form of holder applied thereto, and in which holder is mounted a license like that shown in Fig. 8;

Fig. 10 is a perspective view of the holder and license shown in Fig. 9, on an enlarged scale, together with a part of the truck frame; and Fig. 11 shows a number plate permanently attached to an automobile radiator.

In Fig. 1 is shown an automobile of the touring type and indicated as an entirety by the numeral 12 with the exception of the back 13 of its body, and spare tire 14 carried by the frame of said automobile, rearward of its back 13.

Referring first to the invention shown in Figs. 1 to 7, inclusive, the numeral 15 indicates a holder comprising a pressed metal outer member 16 and a cast relatively heavy inner member 17 having a relatively large rectangular horizontally extended opening 18 and a relatively small rectangular vertically extended opening 19 located relatively close to the left-hand end of the opening 18. This holder 15 may be attached to a vehicle at any suitable place, but it is preferably located, as shown in Fig. 1, in the vehicle back 13 above the spare tire 14 where it may be easily seen and be out of the dust and mud.

In applying the holder to the vehicle back 13, an opening is first cut in said back with substantially the same outlines as the inner edge portion of the inner member 17. This inner member is then inserted through said opening, placed against the inner surface of the vehicle back 13 and rigidly secured thereto by brazing, rivets, rolling the marginal edge portion of said back, at the opening therein, through the openings 18 and 19 and over the respective edge portions of said member into interlocking engagement therewith, or in any other suitable way. The outer member 16 is then secured to the vehicle back 13 and inner member 17 in the same or any other suitable manner. As the outer member 16 is relatively thin, the same will closely engage the vehicle back 13 and give the holder 15 a neat and finished appearance.

Integrally or otherwise formed with the inner member 17 is a casing 20 that is entirely closed except for the openings 18 and 19 in the inner member 17. Pressed from the outer memer 16 is an outstanding endless stop or retaining bead 21 which is located intermediate of the edges of the inner member 17 and extends parallel thereto. The outer member 16 is cut away to afford an opening that is coincident with the opening 18, and through which openings, access to the interior of the casing 20 may be had. Rigidly secured to the inner face of the inner member 17 at each end thereof is a high class lock 22 and 23 and having lock bolts arranged, when projecting, to extend, the former into the opening 18 and the latter into the opening 19. The casings for the tumblers of these locks 22 and 23 extend outward through apertures in the outer member 16 provided therefor. Two laterally spaced apertures 24 are formed in the outer member 16 in front of the opening 19 in the inner member 17 for a purpose that will presently appear.

The invention also provides a license comprising a number plate 25 and a date plate 26, and which plates overlie the openings 18 and 19, respectively, and completely fill the space within the bead 21. This bead 21 closely engages the marginal edge portions of the plates 25 and 26, except at their abutting edges where they closely engage one another, thus making it difficult to insert a tool or other instrument under the plates 25 and 26 for the purpose of prying the same from the holder 15.

On the back of the number plate 25 is a hinge-acting lug 27 and a lock element 28, and on the back of the license plate 26 is a hinge-acting lug 29 and a loop-like lock element 30. The hinge-acting lugs 27 and 29 are arranged to interlock with the inner member 17, and the lock elements 28 and 30 are adapted to receive the lock bolts of the locks 22 and 23, respectively, to secure the plates 25 and 26 to the holder 15. It will be noted that the hinge-acting lug 27 and lock element 28 extend into the casing 20 through the opening 18 and that the hinge-acting lug 29 and lock element 30 extend into the casing 20 through the opening 19 and apertures 24.

The number of the license is indicated on the plate 24 by means of raised letters 31 formed therewith. Indicated on the plate 26, by means of raised characters, is the name 32 of the State issuing the license, the serial number 33, the year 34, the name of the vehicle 35, the type of body and number 36, and engine number 37. In some instances it may be desirable to have the information 35, 36 and 37 on the plate 25, and which plate may remain with the vehicle throughout its life while a new plate 26 will have to be provided each year to indicate that the license is kept in force from year to year. Preferably, the plates 25 and 26 will be of a different color, as indicated at 38 and 39, respectively, and the color of the plate 26 will be changed each year. The plates 25 and 26 are preferably made from a cast material that will stand ordinary rough usage but will break or be mutilated in case an attempt is made to remove the same from the holder 15 or deface the characters thereon.

As previously stated, the plates 25 and 26 are preferably locked to the holder 15 by an official, and the keys retained by him so that the owner of the vehicle or an unauthorized person cannot shift the license plates from one vehicle to another or substitute other plates therefor.

A tail lamp 40 is located above the number plate 25 and is arranged to illuminate the entire license, and its attaching stem 41 is extended through a bifurcated projection 42 on the outer plate 16 and an apertured lug 43 on the inner plate 17 and secured from the inside of the back 13 so that the same cannot be removed.

Referring to the invention as shown in Fig. 8, the numerals 44 of the license are pressed directly from the back 45 of the vehicle together with an endless bead 46. Other identifying means such as the name of the vehicle 47, type of body 48, and engine number 49, are also pressed from the back 45. That portion of the body 45 within the bead 46 constitutes a plate 50 in a broad sense. This plate 50, at the left-hand end of the numerals 44 is cut away at 51 to receive a removable license plate 52. Surrounding the opening 51, at the inner face of the back 45 is an inner frame member 53. Formed with the license plate 52 is the name 54 of the State issuing the license, the serial number 55, and year 56. The license plate 52 may be formed from the same material as the plates 25 and 26 and is secured to the inner member 53 in the same manner that the plates 25 and 26 are secured, to wit: a separable hinge-acting lug 57 and a loop-like lock element 58 and lock 59.

The tail lamp 45' is secured to the back 45 above the number plate 50 and arranged to illuminate said plate and the license plate 52.

Referring now to the invention illustrated in Figs. 9 and 10, which is especially adapted for use on trucks, the numeral 60 indicates a truck as an entirety with the exception of the frame 61, to the rear cross member of which is secured a cast casing 62 having on its face an endless retaining bead 63. On the ends of the casing 62 are cast ears 64 which bear upon the truck frame 61 and are riveted or otherwise rigidly secured thereto. The face of the casing 62, within the bead 63, at the right, affords a number plate 65 on which is cast license numerals 66. The casing 62, at the left of the numerals 66, and within the bead 63, is cut away to afford access to the interior of the casing and to receive a removable license plate 67 with which is formed the name 68 of the State issuing the license, the serial number 69, year 70, name of the truck 71, kind of vehicle 72, and engine number 73. The license plate 67 is secured to the casing 62 in the same manner that the license plates 26 and 52 are secured, and only the lock 74 of which is shown. A tail lamp 75 is secured to the casing 62 above the number plate 65 and is arranged to illuminate said plate and the license plate 67.

In Fig. 11 is illustrated a radiator 76, in the upper face of which is pressed or otherwise permanently formed the same license number 77, as shown in Fig. 8. A bead 78 surrounds this number.

What I claim is:

1. The combination with a license plate holder having an inset open seat access to which is closed at the back thereof, a fragile cast license plate mounted in and closing said seat and having identifying characters cast as an integral part with the outer face thereof, and means including concealed locking elements one of which is key-actuated for removably securing the license plate in said seat.

2. Means for identifying a licensed vehicle including a number plate, a fragile cast plate having identifying characters cast as an integral part with the outer face thereof, said cast plate being removably mounted in and closing a depressed open seat access to which is closed at the back thereof and which cast plate is closely associated with the number plate, and means including concealed locking elements one of which is key-actuated for removably securing the cast plate in its seat.

3. The combination with the vehicle body, of a two portion holder comprising inner and outer connected members between which said body extends, removable license plates mounted in depressed seats in said outer member, and means for locking the license plates in their seats.

4. The combination with a vehicle body, of a two-part holder comprising inner and outer connected members between which said body extends, a removable license plate mounted on said outer member, and means for locking the license plate to the holder.

In testimony whereof I affix my signature.

HARRY H. WIEBE.